(12) United States Patent
Johnson et al.

(10) Patent No.: US 6,332,986 B1
(45) Date of Patent: Dec. 25, 2001

(54) TREATMENT OF WATER CONTAINING ORGANIC WASTES WITH AMMONIUM NITRATE

(75) Inventors: Thomas Albert Johnson, Orefield, PA (US); Malee Leeaphon, Cape Elizabeth, ME (US); John Edward Sawicki, Breinigsville; Juan Jesus Burdeniuc, Whitehall, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/613,206

(22) Filed: Jul. 10, 2000

(51) Int. Cl.[7] ........................................................ C02F 1/72
(52) U.S. Cl. ........................ 210/758; 210/761; 210/903; 210/906
(58) Field of Search .................................... 210/757, 758, 210/761, 903, 906

(56) References Cited

U.S. PATENT DOCUMENTS

| | | |
|---|---|---|
| 4,654,149 | 3/1987 | Harada et al. . |
| 5,118,447 | 6/1992 | Cox et al. . |
| 5,221,486 | 6/1993 | Fassbender . |
| 5,641,413 | 6/1997 | Momont et al. . |

FOREIGN PATENT DOCUMENTS

| | | |
|---|---|---|
| 1375259 | 11/1974 | (GB) . |
| 6098297 | 11/1986 | (JP) . |

OTHER PUBLICATIONS

Proesmans, Luan, Buelow of Los Alamos National Laboratory, "Hydrothermal Oxidation or Organic Wastes Using Ammonium Nitrate" (Ind. Eng. Chem. Res. 1997, 36, 1559–1566).

*Primary Examiner*—Betsey Morrison Hoey
(74) *Attorney, Agent, or Firm*—Russell L. Brewer

(57) ABSTRACT

A single step wet oxidation process for treating wastewaters containing organic species, with or without heteroatoms, and anions of strong acids, e.g. sulfate or phosphate ion, or cations of strong bases, e.g., sodium, potassium or calcium ions, and which may contain ammonium ion and/or nitrate ion in addition to added ammonium ion and/or nitrate ion was developed which on thermal treatment near the critical temperature of water removes substantially all the COD and nitrogen through conversion to water, carbon dioxide or carbonate species, nitrogen gas and small amounts of nitrous oxide. Key to the success of the process is the balancing of all reducing species with an equivalent amount of oxidizing species and the balancing of all strong acid anions with strong base cations. The former ensures good removal of organic species, ammonium ion and nitrate ion. The latter ensures maintaining the pH in the range of from 1.5 to 8 thus avoiding severe corrosion problems and regions of pH where rate of reaction of the oxidizing species with reducing species is slow.

9 Claims, No Drawings

TREATMENT OF WATER CONTAINING ORGANIC WASTES WITH AMMONIUM NITRATE

BACKGROUND OF THE INVENTION

Wet air oxidation is a well known treatment process for the removal of COD and BOD from industrial and municipal wastewater streams. The processes involve contacting a wastewater with an oxidizing source, such as oxygen, ammonium nitrate and nitric acid at elevated temperatures and pressures to oxidize pollutants. Most carbonaceous material is converted to carbon dioxide. The nitrogen present either from organo-nitrogen compounds or other sources are converted to nitrogen.

The following references illustrate wet oxidation processes:

Proesmans, Luan and Buelow of Los Alamos National Laboratory (Ind. Eng. Chem. Res. 1997, 36 1559–1566) report on a high temperature and pressure (500° C./345 bar) hydrothermal oxidation process to remove organic compounds from a waste stream using ammonium nitrate as the oxidizing agent. In the oxidation of methanol and phenol, the authors report that unless an excess of oxidizable carbon is present, NOx in the effluent may become a problem. To avoid NOx production and reduce carbon components to carbon dioxide, a polishing step using hydrogen peroxide is suggested.

GB 1,375,259 discloses the wet oxidation of carbon and nitrogen containing materials to gaseous reaction products using HNO3 and/or a nitrate as oxidizing agent, at temperatures of between 150° C. and the critical temperature of water. The preferred oxidizing agent is NH4NO3, which disappears completely from the reaction medium. Example VII shows the treating of a waste stream of caprolactam, the sodium salt of aminocaproic acid and sodium sulfate with nitric acid at a temperature of 300° C. at 15 bars. The patentees report that slow heating of the reaction mixture resulted in reduced corrosiveness of the reactant mixture.

U.S. Pat. No. 4,654,194 discloses the use of a noble metal catalyst supported on a titania carrier in a wet oxidation process to decompose ammonium nitrate at 250° C. for 60 minutes. Approximately from 50–99% decomposition of both ammonium nitrate and nitrite is achieved without air present. Further examples show wet oxidation of phenol with 0.2 times the required amount of oxygen.

JP 60–98297, JP 61 257,292 and JP 61 257,291, discloses the catalytic wet oxidation of ammonium nitrate wastewaters with 1.0 to 1.5 times the stoichiometric oxygen required for ammonia decomposition, at a pH of 3–11.5 at a temperature from 100 to 370° C. with a supported noble metal catalyst.

U.S. Pat. No. 5,118,447 discloses a process for the thermochemical nitrate destruction where an aqueous solution of nitrate or nitrite is contacted with a stoichiometric amount of formic acid or formate salt, depending upon the pH. Wet oxidation is effected by heating to 200 to 600° C. in the liquid phase to form elemental nitrogen and carbon dioxide. The reaction may be carried out over a pH range of 0–14.

U.S. Pat. No. 5,221,486 discloses a denitrification process where the types of nitrogen compounds present in a waste stream are identified and quantified. The oxidized and reduced forms of nitrogen are balanced and, then, an appropriate nitrogen containing reactant, such as ammonia or a nitrite or nitrate compound, is added and the mixture is heated to 300 to 600° C. under pressure to effect denitrification.

U.S. Pat. No. 5,641,413 discloses the two stage wet oxidation of wastewater containing a carbonaceous and nitrogen species. In the first stage the COD is removed by wet oxidation at a temperature of less than 373° C. and a pressure sufficient to maintain a liquid water phase. The remaining nitrogen compounds are converted to nitrogen in the second stage by adding sufficient inorganic nitrogen-containing compound to the oxidized wastewater to produce essentially equal concentrations of ammonia-nitrogen, nitrite-nitrogen plus nitrate-nitrogen and a waste stream of reduced COD. Mineral acid is added to the oxidized wastewater to produce a pH between 4 and 7. Optionally, a transition metal salt is added, to catalyze a thermal denitrification step. The last step is conducted at 100° to 300° C. to decompose the nitrogen compounds.

BRIEF SUMMARY OF THE INVENTION

This invention relates to an improvement in the wet oxidation of waste streams using ammonium nitrate as the oxidizing agent. The basic process comprises adding ammonium nitrate or precursors thereof to a waste stream in desired amount to reduce the carbonaceous components to carbon dioxide and the nitrogen components to nitrogen. The improvement for reducing the corrosiveness of waste streams contaminated with sulfur or phosphorous containing compounds, whether organic or inorganic, while maintaining reaction rate comprises: operating said process within a pH from about 1.5 to 8 and preferably within a pH range of from about 1.8 to 4.

The basic method for pH control involves maintaining the ratio of $M/SO_4^{-2}$ of from 0.1 to 4, preferably 0.2 to 1.0 and most preferably a ratio of 0.4 to 0.7. A ratio of $M/PO_4^{-3}$ of from 0.1 to 2, preferably 0.2 to 0.67 during the wet oxidation process is used. M is an alkali metal or alkaline earth metal cation and the ratio of $M/SO_4^{-2}$ and $M/PO_4^{-3}$ is based upon an equivalence basis. By maintaining these ratios, while balancing the reaction such that the carbon species is converted to carbon dioxide and the nitrogen containing species is converted to nitrogen, the corrosiveness of the reaction mixture is reduced and the reaction rate is maintained.

The process of this invention offers several advantages and they include:

- an ability to minimize the corrosiveness of wet air oxidation streams by maintaining pH control;
- an ability to eliminate the necessity of a second oxidative step to meet total organic (TOC) and total nitrogen removal requirements whereas many prior art processes remove nitrate ion but leave unreacted organics or ammonium ion in the effluent; and,
- an ability to maintain excellent reaction rates.

DETAILED DESCRIPTION OF THE INVENTION

This invention relates to an improvement in wet oxidation processes involving the destruction of carbonaceous components and nitrogenous components in industrial and municipal wastewater contaminated with sulfur or phosphorus containing components or salts of weak acids and strong bases. The process is a single step wet oxidation process which employs an ammonium nitrate or precursors thereof as the oxidizing agent. Oxygen gas is not required. The process operates in a pH region between 1.5 and about 8 and preferably within a pH region of from about 1.8–4. To accomplish removal of carbonaceous and nitrogenous components to a desirable level requires balancing the oxidation and reduction properties of all of the oxidizable and reducible species present in the wastewater stream. All nitrogen containing species, organic or inorganic, produce substantially only nitrogen and minor amounts of nitrous oxide gas and all carbon containing species produce substantially only carbon dioxide.

The key to pH control and to the maintaining of reaction rate during wet oxidation of wastewater streams contaminated with sulfur or phosphorus substances and alkali and alkaline earth metals (designated M) is in the control of the $M/SO4^{-2}$ and $M/PO4^{-3}$ ratio (equivalence basis). This is accomplished as follows: contaminants whose anions are of strong acids, e.g., sulfate and phosphates are balanced with alkali or alkaline earth metal cations and conversely, cations of strong bases are balanced with sulfate or phosphate. The ratio of $M/SO4^{-2}$ is maintained from 0.1 to 4, preferably 0.2 to 1.0, most preferably from 0.4 to 0.7 and the ratio of $M/PO4^{-3}$ of from 0.1 to 2, preferably 0.2 to 0.67 during wet oxidation. Lower ratios, <0.4 for $M/SO4^{-2}$ may be tolerated when the process effluent designed permits operation with some residual carbon compounds in the effluent. High ratios reduce reaction rate.

To implement this process and effect balancing of the components in the waste stream, the waste stream is analyzed for composition using well known analytical procedures, e.g., ion, gas and liquid chromatography and ICP-AES. First, the carbon content in terms of COD and TOC is determined, particularly if the organic components are difficult to analyze on a component by component basis. Ascertaining the quantity of COD test can be accomplished by oxidizing a known volume of the wastewater with potassium dichromate and expressing the result as the weight of oxygen required to oxidize the carbon in the sample to carbon dioxide. Since the COD measures the mg of O2 required to oxidize 1 liter of wastewater containing the reducible species, one only needs to equate this number to the weight of ammonium nitrate needed to do the same job. There are some cases where a COD measurement will not adequately represent the total amount of reducibles. Certain amines and refractory organics are not readily oxidized by dichromate and thus are not accounted for by the COD measurement. However even if this type of organic is present, the COD measured is a good starting point for determining the amount of ammonium nitrate needed for treatment. If some of the TOC is not oxidized, then the amount of ammonium nitrate added to the influent may be adjusted (an iterative process) until enough is present to oxidize the reducibles to the desired level. Sometimes one may want to operate to completion and sometimes less than completion depending upon the desired effluent specifications.

Once the above analytical analysis of the wastewater is performed, the reduction/oxidation (redox) half reactions for the wet oxidation process can be written. This requires an identification of the oxidizing species and the reducing species. For simplification, the following guidelines may be used:

Those carbon containing species, including those with heteroatoms, where the carbon atom is oxidized on conversion to carbon dioxide are reducing species or agents. Carbon dioxide, bicarbonates, carbonates and the like, which maintain the same oxidation state are not.

Those nitrogen containing species where the nitrogen atom is oxidized on conversion to nitrogen are also reducing species. The ammonium ion is a reducing species.

Those nitrogen containing species where the nitrogen atom is reduced on conversion to nitrogen are oxidizing species. The nitrate and nitrite ions are oxidizing species.

Oxygen gas and peroxy oxygen are oxidizing species.

Any sulfur atom in any organic or inorganic species will change to sulfate ion

Any phosphorus atom in any organic or inorganic species will change to phosphate ion.

Any oxygen atom in any organic or inorganic peroxide species will change to $O^{-2}$, as in water.

The following elements are assumed that the oxidation/reduction state does not change during wet oxidation:

Organo halogen or halide ion

Ether, alcohol and carbonyl oxygen

Alkali and alkaline earth metal cations.

Common metal cations (e.g., generated from materials of construction) in their highest normal oxidation state, e.g., $Fe^{+3}$, $Ni^{+2}$, $Cr^{+3}$, $Al^{+3}$, $Cu^{+2}$, $Zn^{+2}$, etc.

The oxidizing species in the wet oxidation process is ammonium nitrate and precursors thereof. In the process, ammonium nitrate may be added to the wastewater in the desired amount or ammonium nitrate may be added by introducing ammonia or nitric acid, depending upon the extent of the contaminant in the wastewater stream.

The maintenance of pH of the reaction stream is based upon controlling the $M/SO4^{-2}$ and $M/PO4^{-3}$ ratio by addition of alkali metal and alkaline earth metals or sulfuric acid or phosphoric acid to the wastewater as required. When the $M/SO4^{-2}$ ratio or the $M/PO4^{-3}$ ratio is calculated to fall below specified limits, e.g., preferably not below 0.2, alkali is added. When the ratio exceeds about 1.0 for $M/SO4^{-2}$, preferably 0.67 for $M/PO4^{-3}$; sulfate or phosphate are added as ammonium salts or free acids to reduce the pH. A high $M/SO4^{-2}$ and $M/PO4^{-3}$ ratio can lead to excessive reaction times.

The alkali and alkaline earth metal source for the wet oxidation is typically a sodium ion although other alkali metals such as lithium, potassium, cesium and so forth may be used. For reasons of efficiency, the alkali metals are added as the oxide or hydroxide. If substantial levels of alkali metal salts of organic substances are added, then the anionic component must be considered in the redox half reaction. When the anion is an oxide or the hydroxide, the anion need not be considered. Alkaline earth metals may be used in the wet oxidation process to provide the M component. However, these metals often form insoluble salts and thus may cause plugging or fouling the reactor. Therefore, in the practice of the process, it is preferred to use Group 1 metals, preferably sodium, to provide the cationic component M.

This wet oxidation process operates generally without the use of a catalyst at temperatures near the supercritical temperature of water, i.e., 300 to 400° C., preferably 360 to 374° C. Transition metal catalysts such as those used in wet oxidation processes can be added as need or desired. These metals include V, Cr, Mn, Fe, Co, Ni, Cu, Zn, and Mo.

Pressures are controlled to a high enough pressure to maintain a liquid phase behavior for both the influent and the effluent. If gas phase conditions occur, the salts in the wastewater oxidation product may precipitate and cause plugging of the reactor.

While not intending to be bound by theory, wastewaters contaminated with organic sulfate or phosphorus decrease in pH during wet oxidation. In the wet oxidation process, the organic component or ammonium ion are consumed thereby leading to the sulfuric or phosphoric acids and a lower pH, sometimes to a pH lower than 1.5. The corrosiveness of the reaction mixture at low pH increases substantially which then leads to corrosion of stainless steel reactors, for example. Conversely, if alkali or alkaline earth metal salts of organic substances are present in the wastewater, the organic portion of the salt is oxidized. The alkali and alkaline earth metal cations pair up with the carbonate ion and the pH may well rise over 8. Although corrosion associated with high pH reaction media is minimal, the reaction rate at high pH often is severely reduced and extended residence times may be required to oxidize carbon and reduce nitrogen species.

The following examples are provided to illustrate various embodiments and provide rules for guidance to balance the reduction and oxidation half reactions and are not intended to restrict the scope thereof.

EXAMPLE 1

Oxidation of Methanol and Nitrobenzene With Ammonium Nitrate

A liter of wastewater contains 1000 ppm methanol (1000 mg/liter) and 25 ppm nitrobenzene (25 mg/liter) is to be oxidized in a wet oxidation process using ammonium nitrate as an oxidizing agent. The half reactions are written to determine the amount of ammonium nitrate needed to convert these materials to $H_2O$, $CO_2$ and $N_2$ in a wet oxidation process.

Reduction half reaction
1. $CH_3OH + H_2O = CO_2 + 6\ H^+ + 6\ e^-$
   meq of CH3OH=1000 mg/32 mg/meq=31.25 meq
   meq of electrons produced=31.25×6=187.5 meq
2. $C_6H_5NO_2 + 10\ H_2O = 6\ CO_2 + 25\ H^+ + ½\ N_2 + 25\ e^-$
   meq of nitrobenzene=25 mg/123 mg/meq=0.20325 meq
   meq of electrons produced=0.20325×25=5 meq Adding the two reduction reactions, the total meq of electrons/liter produced by the reducing species=187.5+5.0=192.5 meq/liter Oxidation half reaction
1. $NH_4NO_3 + 2\ H^+ + 2\ e^- = N_2 + 3\ H_2O$ The meq of electrons required to reduce 1 mg of $NH_4NO_3$=1 mg/80 (mg/mmole)/2 meq/mmole))=0.025 meq electrons or 0.025 meq/mg of $NH_4NO_3$.

Therefore, the weight of $NH_4NO_3$ needed per liter of wastewater =192.5 (meq/liter)/(0.025 (meq/mg)=7,700 mg or 7.7 gms to oxidize one liter of waste water containing 1000 ppm methanol and 25 ppm nitrobenzene.

EXAMPLE 2

Wet Oxidation Of Wastewater Contaminated With Sulfate Ion

A waste stream was analyzed by ion chromatography and by COD analysis and was found to contain the following composition.

| $NH_4^+$ meq/liter | $NO_3^-$ meq/liter | $SO_4^{-2}$ meq/liter | COD mg $O_2$/liter |
|---|---|---|---|
| 146.2 | 25.0 | 121.2 | 1500 |

The objective here was to demonstrate a method of maintaining the pH in the influent and the effluent between about 2 and 8 by appropriate balancing of anions and cations through addition of a reducing agent or oxidizing agent, whichever was needed.

Reduction half reactions
1. $NH_4^+ = ½\ N_2 + 4\ H^+ + 3\ e^-$

Therefore, 146.2 meq $NH_4^+$ yields 3×146.2 or 438.6 meq of electrons.

2. COD 1500 mg O2/liter is converted to meq of electrons. 1500×0.125 meq electrons/mg O2=187.5 meq electrons. Total reduction electrons=438.6+187.5=626.1 meq electrons.

Oxidation Half Reaction
1. $NO_3^- + 6\ H^+ + 5\ e^- = ½\ N_2 + 3\ H_2O$ 25 meq $NO_3^-$×5 meq e/meq $NO_3^-$=125 meq electrons required for $NO_3^-$.

The electron differential between the reduction and oxidation half reactions is the addition product of the reactions, specifically 626.1 meq available minus 125 meq=501.1 meq electron excess. Thus, 501.1 meq electrons of oxidizer is required to meet the required stoichiometry.

To balance the oxidation/reduction requirements, more nitrate ion is required. Since one equivalent of nitrate ion requires 5 equivalents of electrons to become reduced to nitrogen, 100.2 meq of nitrate ion are required.

To maintain the pH in the appropriate range of 2 to 8 the $M/SO4^{-2}$ ratio needs to be in the range of from 0.1 to 4, preferably 0.4 to 1. The amount of alkali or alkaline earth metal thus is 24.24 to 121.2 meq to satisfy the sulfate ion present. Since the 100.2 meq of nitrate ion needs an equivalent amount of a cation, using 100.2 meq of sodium ion satisfies both the redox and the amount of alkali metal/sulfate ion requirements. Thus, 8.52g of $NaNO_3$ are added.

EXAMPLE 3

Wastewater Streams Having Excess Alkali

A simulated waste stream is prepared which contains 4000 ppm/liter of potassium acetate. Thus, the problem will be one of maintaining the pH below 8 and that of maintaining reaction rate. The issue is how much ammonium nitrate and sulfate ion are needed to convert the acetate to CO2 while keeping the pH from rising over 8.

Oxidation/Reduction Balance

1. Equivalents potassium and acetate=4000 mg/l/98 (mg/meq)=40.8 meq/l of acetate and potassium ion $M/SO4^{-2}$ of 1:1 requires=1999.2 mg/l sulfuric acid, 40.8 meq/l×49 mg/meq
2. Oxidation reaction $CH_3CO_2^- + 2\ H_2O = 2\ CO_2 + 7\ H^+ + 7\ e^-$ Electrons generated from acetate ion=40.8 meq/l×7 electrons/meq=285.7 meq electrons/l 3. Reduction reaction $NH_4NO_3 + 2\ H^+ + 2\ e^- = N_2 + 3\ H_2O$
$NH_4NO_3$ required=285.7 meq electrons/l/(0.025 meq electrons/mg of $NH_4NO_3$) or 11,428 mg/l Therefore, for every liter of wastewater processed by wet oxidation 1.9992 g of sulfuric acid and 11.428 g of ammonium nitrate must be added to convert the acetate to CO2 and the potassium to potassium sulfate, $M/SO_4^{-2} = 1$, (equivalence basis). In the above scenario, the pH of the wastewater will initially drop to about 5 because acetic acid is formed when the sulfuric acid is added to the influent. As the acetic acid and ammonium ion are oxidized by the nitrate ion, the pH will rise to about 7. If a ratio of $M/SO_4^{-2}$ of less than 1:1 were employed, the pH would fall below 7.

EXAMPLE 4

Wet Oxidation of Simulated Wastewater

Having Sulfate Content But No Carbon Content

A synthetic wastewater was prepared from ammonium nitrate, 98% sulfuric acid and 30% ammonia water and diluted as indicated with DI water to an ammonium nitrate concentration of 1.26% (nitrate ion, 9754 ppm), sulfuric acid concentration of 0.316% and ammonia concentration of 0.242% (total ammonium ion concentration was 5298 ppm). The molar ratio of nitrate ion to ammonium ion was 0.536.

This solution was pumped through ⅛ inch OD 316 SS tubing of internal volume 70 ml at a room temperature flow rate of 6.8 ml/min. The superficial residence time based on a room temperature flow rate was 10.3 min. The tubing was in a fluidized sand bath heated at 363° C. while the pressure was regulated at 3,142 psig with a back pressure regulator. A water cooled condenser was attached to the exit of the tube to cool the effluent to room temperature. After several reactor volumes had passed through the reactor, a sample of the effluent was analyzed for nitrate ion, ammonium ion, iron, chromium and nickel. The pH of influent and effluent was monitored.

EXAMPLE 5

Wet Oxidation of Simulated Wastewater

Having High Sulfate Content but Not Sodium Ion

As in Example 4, synthetic wastewater with no carbon content was prepared containing similar concentrations of all components but adjusted so the nitrate and ammonium ion concentrations were essentially balanced, i.e., the stoichiometric amounts of each were added so all the nitrate and ammonium ion would be consumed. The molar ratio of nitrate to ammonium ion was adjusted to 0.598 (theory is 0.60). The $M/SO_4^{-2}$ ratio was 0. These results and those of Example 4 are presented in Tables 1 and 2.

From Table 1, 95.86% of the nitrate ion and 78.66% of the ammonium were removed by this treatment. The pH however dropped from 6.8 to 1.5. The effluent contained 0.29 ppm iron, 40.3 ppm chromium and 14.7 ppm of nickel which demonstrated that although there was excellent removal of the nitrate ion and the ammonium ion, the conditions were such as to severely corrode the stainless steel reactor. (A corrosion analysis of 7 ppm or greater is deemed excessive.)

TABLE 2

| | | Metals in Effluent | | | Nitrate | Ammonium |
| --- | --- | --- | --- | --- | --- | --- |
| Example | Effluent pH | Fe ppm | Cr ppm | Ni ppm | Removal % | Removal % |
| 4 | 1.5 | 0.29 | 40.3 | 14.7 | 95.86% | 78.66% |
| 5 | 1.5 | 0.58 | 92.0 | 19.3 | 95.43% | 83.69% |

From Table 2, Example 4 shows that good removal of nitrate and ammonium ion was obtained but since almost 16% of the ammonium ion still remained while only about 4% of nitrate remained it follows that some other reducing agent other than ammonium ion acted in the removal of nitrate ion. Since no other reducing agent other than ammonium ion was present in the simulated wastewater, the metal reactor provided the reducing agent necessary for reducing that portion of the nitrate ion not consumed by ammonium ion. Thus, it is not sufficient in a wet oxidation process to just redox balance nitrate ion with ammonium ion to operate without corrosion in stainless steel equipment.

EXAMPLE 6

Wet Oxidation of Simulated Wastewater

Having High Sulfate Content

In Examples 4 and 5 the pH dropped to 1.5 as the wastewater passed through the reactor. It was believed that initially both nitrate and sulfate ions in the wastewater were countered by ammonium ions, but as the ammonium ion reacted, sulfuric acid was generated and the pH decreased. This example pairs sulfate ions with sodium ions in an effort to allow all of the ammonium ion to be reacted without the pH dropping to low levels.

A synthetic wastewater was prepared from 11.98 g ammonium nitrate, 6.7 g ammonium sulfate, 11.9 g sodium sulfate and 1.0 g ammonium acetate and diluted with 1 liter of deionized water. The equiv. ratio of sodium ion to sulfate ion was 0.59. For purposes of calculation, an $MSO_4^{-2}$ ratio of 0.5 is assumed to be sodium bisulfate and an $M/SO_4^{-2}$ ratio of 1:1 is assumed to be sodium sulfate.

As in Example 5 the wastewater was thermally treated in a ⅛ inch OD stainless steel tube of 70 ml volume at 362° C. and feed rate of about 7 ml/min. Tables 3 and 4 show the conditions and results.

TABLE 1

| Example | $NO_3^-$ ppm | $NH_4^+$ ppm | $SO_4^{-2}$ ppm | $NO_3/NH_4$ molar | Reducing Agent Excess (%) $NH_4^+$ | Influent pH | Residence Time min |
| --- | --- | --- | --- | --- | --- | --- | --- |
| 4 | 9754 | 5298 | 3221 | 0.536 | 15.2 | 6.8 | 10.3 |
| 5 | 9207 | 4482 | 4827 | 0.598 | 0.6 | 5.06 | 10.6 |

TABLE 3

| Example | NO$_3$ ppm | NH$_4$ ppm | SO$_4$ ppm | Na ppm | TOC ppm | NO$_3$/NH$_4$ mole ratio | M//SO$_4^{-2}$ mole ratio | Potential Nitrate Removal NH$_4^+$ | Potential Nitrate Removal organic (a) | Influent pH |
|---|---|---|---|---|---|---|---|---|---|---|
| 6 | 8995 | 4605 | 12490 | 3726 | 307 | 0.568 | 0.59 | 105.8 | 114.1 | 6.18 |

(a) Excess reducing capacity contributed by the organic components.

TABLE 4

| Example | pH Effluent | Residence Time min | Nitrate Removal % | Ammonium Removal % | TOC Removal % | Acetate Removal % |
|---|---|---|---|---|---|---|
| 6 | 6.8 | 10 | 26.08 | 13.11 | 67.86 | 72.23 |

Using the sodium ion to pair up with the majority of sulfate ion definitely had a large effect on the pH. However, it also decreased the rate of reaction and only about 26% of the nitrate and 13% of the ammonium ion were consumed. The high level of ammonium ion in the effluent counted largely in the high pH. It should also be noted that a large portion of acetate ion was consumed and, thus, under these conditions acetate acted as a reducing agent.

EXAMPLE 7

Wet Oxidation of Nitroaromatic

In a series of runs nitroaromatic compounds were added to the simulated wastewater of Examples 4 and 5. A higher temperature was used to increase the reaction rate while sodium ion was used to pair with sulfate ion to moderate the pH. The oxidizing and reducing species were carefully balanced using the guidelines presented above to achieve desired reduction. The M/SO$_4^{-2}$ ratio was set at 0.49:1.

A simulated waste stream made up from ammonium nitrate, ammonium sulfate, ammonium acetate, sodium acetate, 2,4-dinitrobenzoic acid (DNBA), 4.6-dinitro-o-cresol (DNOC), sodium hydroxide and water was treated thermally as in Example 4 but a 316 SS ⅛" OD reactor tube of 283 ml internal volume was used. The composition of the waste stream is indicated in Table 5A. The conditions are shown in Table 5B and the results are shown in Table 5C.

TABLE 5A

| Run | NO$_3$ ppm | NH$_4$ ppm | SO$_4$ ppm | Na ppm | DNBA ppm | 4,6-DNOC ppm | Acetate ppm | TOC ppm |
|---|---|---|---|---|---|---|---|---|
| 1 | 15258 | 5120 | 1533 | 375 | 983 | 816 | 844 | 1075 |
| 2 | 15258 | 5120 | 1533 | 375 | 983 | 816 | 844 | 1075 |
| 3 | 15258 | 5120 | 1533 | 375 | 983 | 816 | 844 | 1075 |

TABLE 5B

| Run | NO$_3$/NH$_4$ Mole Ratio | M/SO$_4^{-2}$ Mole Ratio | Potential NO$_3$ Removal By NH$_4$ % | Potential NO$_3$ Removal By Organics % | Influent pH | Temp °C | Pressure psig | Residence Time min |
|---|---|---|---|---|---|---|---|---|
| 1 | 0.867 | 0.5 | 69.4 | 24.7 | 6.67 | 368 | 3066 | 9.4 |
| 2 | 0.867 | 0.5 | 69.4 | 24.7 | 6.67 | 369.1 | 3062 | 18.9 |
| 3 | 0.867 | 0.5 | 69.4 | 24.7 | 6.67 | 369.9 | 3060 | 29.9 |

TABLE 3C

| Run | Effluent pH | Metals Fe ppm | Cr ppm | Ni ppm | Nitrate % Removal | Ammonium % Removal | COD % Removal | TOC % Removal | Acetate % Removal |
|---|---|---|---|---|---|---|---|---|---|
| 1 | 7 | N/D | N/D | 1.15 | 61.01 | 51.77 | 86.36 | 86.44 | 74.30 |
| 2 | 2.9 | N/D | 0.172 | 0.712 | 93.25 | 89.96 | 93.64 | 97.58 | 98.16 |
| 3 | 2.1 | 0.189 | 0.244 | N/D | 99.30 | 96.41 | 92.73 | 98.36 | 96.11 |

Note that the only difference in runs 1–3 was in the feed rate. Thus, the shortest residence time was in run 1 and the longest in run 3. In all three runs, at the higher temperature of 369° C., and superficial residence times of about 19 to 30 minutes almost complete destruction of both nitrate ion, ammonium ion and acetate ion and complete destruction of the aromatic nitro compounds had taken place. Furthermore the amount of corrosion in all examples, as indicated by the amount of metal ions found in the effluent, was almost nil. Clearly when one half mole of sodium ion was present/mole of sulfate ion (M/SO$_4^{-2}$ of 0.59), the pH decreased as the conversion of ammonium ion occurred. (Contrast to the high ammonium level in Example 6). Little corrosion resulted even at an effluent pH as low as 2.1. In run 3 where the highest feed rate was used, only partial destruction of nitrate ion, acetate ion and ammonium ion occurred because the residence time was too short but nevertheless the nitro compounds and total organic compounds were very effectively removed.

EXAMPLE 8

Wastewater Containing Ammonium Sulfate But No Carbon and No Alkali Metal

A simulated wastewater made up of 12.0 g ammonium nitrate and 17.1 g of ammonium sulfate and 1 liter of water was pumped through a ⅛" tube as in Example 1. The $M/SO_4^{-2}$ ratio was 0. The reaction conditions are shown in Table 6A and the results are shown in Table 6B.

TABLE 6A

| Run # | $NO_3$ ppm | $NH_4$ ppm | $SO_4$ ppm | Mole Ratio $NO_3/NH_4$ | Potential Nitrate Removal by $NH_4$ % | Temp °C. | Press psig | Residence Time min | Influent pH |
|---|---|---|---|---|---|---|---|---|---|
| 1 | 9035 | 7150 | 12079 | 0.368 | 163.6 | 366 | 3140 | 10 | 5.58 |

TABLE 6B

| Run # | Effluent pH | Metals Fe ppm | Cr ppm | Ni ppm | Nitrate Removal % | Ammonium Removal % |
|---|---|---|---|---|---|---|
| 1 | 1.68 | 0.08 | 5.2 | 6.58 | 59.93 | 28.29 |

In this experiment a large excess of ammonium ion, as ammonium sulfate, was used to effect removal of nitrate ion. Under similar conditions to those in Examples 4 and 5, nearly complete removal of nitrate ion occurred. The main difference was that only 3000 to 5000 ppm of sulfate was present in Examples 4 and 5. The results imply that sulfate ion retards the reaction of ammonium ion with sulfate. Only, 28% of the ammonium ion was removed.

Note that on comparing the results of Example 6 where the residence time was the same and as much sulfate was present, the addition of 1.25 moles of sodium ion for every mole of sulfate, ($M/SO_4^{-2}$ ratio of 0.59) in Example 6 caused the reaction to be even slower. However, the amount of corrosion was significantly less and the pH stayed close to neutral. Had there been any greater reduction of ammonium ion in this Example 8, corrosion would have been excessive.

EXAMPLE 9

Wastewater Containing Sulfate and Sodium

A simulated wastewater made up of 51.3 g ammonium nitrate, 18.0 g of sodium sulfate, 5.7 g dinitrobenzoic acid (DNBA), 1.51 g of dinitro-o-cresol (DNOC), 3.0 g ammonium acetate, 2.35 g of 30% ammonia water and 3 liters of water was pumped through a ⅛" tube (70 ml volume) at 3100 psig as in Example 1. The mole ratio of NO3/NH4 was 0.893 and the mole ratio of Na/SO4 was 1.91:1, ($M/SO_4^{-2}$ of 0.96) in all runs. The reaction conditions are shown in Table 7A and results in Table 7B.

TABLE 7A

| | Feed ppm | | | | | Potential NO3 Removal | | Temp | RT | Influent |
|---|---|---|---|---|---|---|---|---|---|---|
| Run | NO3 | NH4 | SO4 | Na | TOC | by NH4 | by Organics | °C. | min | pH |
| 1 | 12897 | 4200 | 3950 | 1891 | 1245 | 67.5 | 32.2 | 361 | 4.9 | 6.9 |
| 2 | 12897 | 4200 | 3950 | 1891 | 1245 | 67.5 | 32.2 | 362 | 9.2 | 6.9 |
| 3 | 12897 | 4200 | 3950 | 1891 | 1245 | 67.5 | 32.2 | 361 | 17.1 | 6.9 |
| 4 | 12897 | 4200 | 3950 | 1891 | 1245 | 67.5 | 32.2 | 368 | 5.4 | 6.9 |
| 5 | 12897 | 4200 | 3950 | 1891 | 1245 | 67.5 | 32.2 | 367 | 10.3 | 6.9 |
| 6 | 12897 | 4200 | 3950 | 1891 | 1245 | 67.5 | 32.2 | 367 | 15.2 | 6.9 |

TABLE 7B

| | | Metals | | | Nitrate | Ammonium | Acetate | |
|---|---|---|---|---|---|---|---|---|
| Run | Effluent pH | ppm Fe | ppm Cr | ppm Ni | Ion % Loss | Ion % Loss | Ion % Loss | TOC % Loss |
| 1 | 7.0 | | | | 25.23 | 22.94 | 46.93 | 44.15 |
| 2 | 7.0 | N/D | 0.44 | 0.93 | 43.33 | 37.23 | 46.22 | 50.82 |
| 3 | 7.3 | N/D | 0.81 | 0.56 | 61.89 | 51.96 | 76.67 | 65.57 |
| 4 | 6.9 | N/D | 0.36 | 1.09 | 47.22 | 41.52 | 56.81 | 53.46 |
| 5 | 7.0 | N/D | 0.31 | 0.8 | 59.20 | 52.33 | 71.07 | 63.84 |
| 6 | 6.8 | 0.19 | 0.83 | 0.39 | 73.85 | 67.12 | 87.47 | 77.27 |

Not shown in these tables is that both dinitrobenzoic acid and dinitrocresol were completely removed by the wet oxidation treatment using ammonium nitrate. In these runs one equivalent of sodium ion was present for each equivalent of sulfate ion and as a result the pH remained near neutral and, therefore, the amount of corrosion as indicated by the low metal ion concentration in the effluent was very low.

The rate of loss of nitrate, ammonium ion, acetate and TOC in Example 9 was less than Example 7 where half as much sodium ion was used with respect to the amount of sulfate present in the feed. In Example 7 the pH dropped to about 2 thus leading to a faster reaction rate. Even so, operating at a neutral pH where corrosion is still very low, allows a significant treatment rate to be attained.

It would be expected that with a longer residence time the nitrate ion, ammonium ion and total organic carbon would have been reduced to very low levels without significant corrosion since the pH is expected to not change appreciably.

EXAMPLE 10

Addition of Sulfuric Acid

No Ammonium Ion

A simulated wastewater prepared from sodium nitrate, sodium sulfate, methanol and water was treated in ⅛" stainless steel tube as in Example 4. The calculated $M/SO_4^{-2}$ ratio was 8.96. The composition of these simulated wastewaters are shown in Tables 8A and the results are shown in Table 8B.

This experiment demonstrates that nitrate ion by itself, even with an equivalent amount of organic reducing agent present, is not sufficient for obtaining the reduction/ oxidation behavior necessary for treating a waste stream. The high $M/SO_4^{-2}$ ratio retarded the rate of reaction and thus, even the initial acidity was insufficient to permit conversion of the nitrate ion.

EXAMPLES 11

Wastewater Contaminated With Ammonia and Sodium

A simulated wastewater was prepared from ammonium and sodium nitrate, sodium sulfate and methanol and treated as in Example 1. The $M/SO_4^{-2}$ ratio was calculated to be 3.13. The temperature ranged from 368 to about 270° C. and the pressure ranged from 3103 to 3119 psig. The wastewater composition is in Table 9A and the results in Table 9B.

TABLE 8A

| Run # | NO3 | NH4 | SO4 | Na | TOC | NO3/NH4 | Potential Nitrate Removal by Organics % | Influent pH | Temp ° C. | Pres psig | Residence Time min |
|---|---|---|---|---|---|---|---|---|---|---|---|
| 1 | 14068 | 0 | 1304 | 5843 | 5429 | 0.000 | 95.6 | 6.76 | 369.8 | 3235 | 30.4 |
| 2 | 14074 | 0 | 1274 | 5523 | 5431 | 0.000 | 95.6 | 2.86 | 370.2 | 3204 | 32.9 |

TABLE 8B

| Run # | Effluent pH | Metals Fe ppm | Cr ppm | Ni ppm | Nitrate Removal % | Ammonium Removal % | TOC Removal % |
|---|---|---|---|---|---|---|---|
| 1 | 7.6 | N/D | N/D | N/D | 7.71% | 0 | 3.96% |
| 2 | 6.95 | N/D | N/D | N/D | 0.00% | 0 | 0.00% |

TABLE 9A

| Run # | NO3 ppm | NH4 ppm | SO4 ppm | Na ppm | TOC ppm | Mole Ratio NO3/NH4 | Potential Nitrate Removal by NH4 | Potential Nitrate Removal by Organics | Influent pH | Residence Time min |
|---|---|---|---|---|---|---|---|---|---|---|
| 1 | 15280 | 3132 | 1533 | 2399 | 2188 | 1.419 | 29.4 | 61.6 | 6 | 9.9 |
| 2 | 15280 | 3132 | 1533 | 2399 | 2188 | 1.419 | 29.4 | 61.6 | 6 | 20.4 |
| 3 | 15280 | 3132 | 1533 | 2399 | 2188 | 1.419 | 29.4 | 61.6 | 6 | 30.4 |

TABLE 9B

| Run # | Effluent pH | Metals Fe ppm | Cr ppm | Ni ppm | Nitrate Removal % | NH4 Ion Removal % | COD Removal % | TOC Removal % |
|---|---|---|---|---|---|---|---|---|
| 1 | 7.1 | 1.27 | N/D | N/D | 78.41 | 90.38 | 76.92 | 73.53 |
| 2 | 7.2 | 0.13 | N/D | N/D | 78.73 | 89.62 | 48.95 | 41.86 |
| 3 | 7.2 | 0.14 | N/D | N/D | 79.48 | 89.52 | 50.35 | 42.63 |

This experiment shows that only small amounts of ammonium ion are needed to activate nitrate ion to oxidize organic components such as methanol. Contrasting Example 10 runs 1 and 2, nitrate ion was shown to be almost completely ineffective in oxidizing methanol in the absence of ammonium ion. Also, note in this example since sodium ion was in excess of the amount needed to stoichiometrically balance sulfate ion, the pH actually rose slightly thus showing lower ratios are preferred. However, essentially no corrosion occurred.

EXAMPLE 12

Wastewater Contaminated With Sulfate and Sodium

A simulated wastewater made up of 55.4 g ammonium nitrate, 5.4 g ammonium sulfate, 13.7 g of sodium sulfate, 6.1 g dinitrobenzoic acid, 1.62 g of dinitro-o-cresol, 5.6 g sodium acetate trihydrate, 38.3 ml of 1 N NaOH and 1 liter of water was pumped through a ⅛" tube (70 ml volume) as in Example 4. The $M/SO_4^{-2}$ ratio was calculated to be 0.95, i.e., sodium sulfate. The temperature was 367° C. and the pressure ranged from 3086 to 3117 psig. The reaction conditions are shown in Table 10A and results in Table 10B.

but the efficiency of treatment at comparable residence times was nearly the same. The $M/SO_4^{-2}$ ratio of 0.95 gave good results in terms of pH control. However, residence times were quite long. Longer residence times would have been necessary to reduce the nitrate ion, ammonium ion and TOC to the desired levels.

EXAMPLE 13

Wet Oxidation of DNT Stream

No $M/SO_4^{-2}$ Ratio Control

A wastewater from a DNT plant was treated in a ⅛ inch OD reactor of 37 ml volume at a residence time of 10.6 minutes at 367–369° C. and 3000 psig. In Run 1, one tenth of the flow was 3% hydrogen peroxide and nine tenths was the wastewater while in Run 2 100% of the flow was the wastewater. The wastewater was analyzed for COD, TOC, dinitrotoluenes (DNT), trinitrocresols (TNC), acetate ion, nitrate ion, sulfate ion, ammonium ion and pH. The same analytical procedures were used to analyze the wastewater after the treatment. In addition the wastewater was analyzed for Fe, Cr and Ni after the treatment. The concentration of

TABLE 10A

| Run # | NO3 ppm | NH4 ppm | SO4 ppm | Na ppm | TOC ppm | Mole Ratio NO3/NH4 molar | NO3 NH4 | Potential Removal Organic | Temp ° C. | Influent pH |
|---|---|---|---|---|---|---|---|---|---|---|
| 1 | 38112 | 12363 | 11718 | 5571 | 3634 | 0.897 | 67.1 | 31.8 | 367 | 6.6 |
| 2 | 38112 | 12363 | 11718 | 5571 | 3634 | 0.897 | 67.1 | 31.8 | 367 | 6.6 |
| 3 | 38112 | 12363 | 11718 | 5571 | 3634 | 0.897 | 67.1 | 31.8 | 367 | 6.6 |

TABLE 10B

| Run # | Effluent pH | Metals ppm Fe | ppm Cr | ppm Ni | Nitrate % Loss | Ammonium % Loss | Acetate % Loss | TOC % Loss | DNOC % Loss | DNBA % Loss |
|---|---|---|---|---|---|---|---|---|---|---|
| 1 | 6.9 | N/D | N/D | 4.05 | 24.8 | 24.5 | 26.9 | 59.1 | 100.0 | 99.8 |
| 2 | 7.1 | 0.27 | 0.36 | 3.4 | 46.2 | 43.4 | 43.6 | 68.2 | 100.0 | 99.8 |
| 3 | 7.3 | N/D | N/D | 3.24 | 62.9 | 54.8 | 62.7 | 82.2 | 100.0 | 99.9 |

This example shows that increasing the concentration of the organic and inorganic components in the simulated wastewater did not change the overall result of the thermal treatment. In Example 9 Runs 1–6, the concentrations of components were about ⅓ that in Runs 1–3 of this example components before and after treatment and the percent removal of COD, TOC, DNT, TNC, acetate ion, ammonium ion and nitrate ion are shown in Table 9. No sodium ion was added to this waste stream so therefore the $M/SO4^{-2}$ ratio was zero.

TABLE 9

Analysis of Wastewater

| Stream | Before Treatment | | After Treatment | | After Treatment % Removal | |
|---|---|---|---|---|---|---|
| Run | 1 | 2 | 1 | 2 | 1 | 2 |
| H2O2 (mg/L) | 3000 | 0 | — | — | | |
| COD (mg O$_2$/L) | 2027 | 2150 | 0 | 0 | 100 | 100 |
| TOC (ppm) | 689 | 766 | 17 | 20 | 97.6 | 97.4 |
| DNT (ppm) | 678 | 719 | 0 | 0 | 100 | 100 |
| TNC (ppm) | 458 | 486 | 0 | 0 | 100 | 100 |
| Acetate (ppm) | 125 | 133 | 24 | 19 | 72.6 | 85.6 |
| Nitrate (ppm) | 16591 | 17596 | 3119 | 3343 | 81.2 | 81.0 |
| Ammonium (ppm) | 5906 | 6264 | 1784 | 1917 | 69.8 | 69.4 |
| Sulfate (ppm) | 6680 | 6995 | — | — | | |
| pH | 7.1 | 6.9 | 1.3 | 1.7 | | |
| Fe (ppm) | — | — | 4.1 | 0 | | |
| Cr (ppm) | — | — | 11.0 | 3.2 | | |
| Ni (ppm) | — | — | 11.7 | 5.8 | | |

In Runs 1 and 2, as in prior art processes, no attempt was made at trying to redox balance the system or to pair the sulfate ion with an alkali or alkaline earth metal cation. Since the amount of nitrate ion (1419 meq electrons/liter required) far exceeded the amount of reducing species as measured by the sum of COD and ammonium ion (1279 meq electrons/liter produced), one would expect that all the organics and ammonium ion would have reacted if the residence time was long enough. After only 10 minutes, only about 70% of the ammonium ion had reacted. However, all the COD was gone as well as 97% of the TOC. Toxic components like DNT and TNC were completely destroyed. Only a small amount of acetate ion remained.

When a significant amount of hydrogen peroxide was added in Run 1 (equivalent to 176 meq electrons/liter required) to supplement the oxidation process, no more oxidation occurred than when it was not present (Run 2).

These data show that nitrate ion in the presence of ammonium ion is a very good oxidizing agent and much more powerful than oxygen generated from hydrogen peroxide under these conditions. At the end of the treatment the pH had dropped to well below 2 and serious corrosion of the stainless steel reactor tube was very evident from the amount of iron, chromium and nickel found in the treated wastewater. This example shows the importance of maintaining an M/SO4$^{-2}$ ratio of from 0.1 to 4:1 and preferably from 0.2 to 1:1.

EXAMPLES 14

Simulated Wastewater

In the following 3 runs conditions were found which gave from 87 to 95% removal of both nitrate ion and ammonium ion as well as removal of almost all the organic carbon. The wastewater was synthesized from the components shown in Table 12A dissolved in 3000 ml of Dl water.

TABLE 12A

| Run | NH4NO3 | 98% H2SO4 | 28% NH3 | (NH4)2SO4 grams | Na2SO4 | DNBA | NaOAco3H2O | 1 N NaOH ml |
|---|---|---|---|---|---|---|---|---|
| 1 | 63.05 | 22.67 | | 7.25 | 7.72 | | 16.17 | 114.80 |
| 2 | 59.06 | 11.79 | 8.26 | | 28.05 | 9.05 | | |
| 3 | 59.06 | 11.79 | 8.26 | | 28.05 | 9.05 | | |

DNBA refers to

The resulting synthetic wastewater had the composition shown in Table 12B.

TABLE 12B

| Run # | NO3 | NH4 | SO4 | Na | TOC | Mole Ratio NO3/NH4 | M/SO$_4^{-2}$ Ratio Na/SO4 | Potential Nitrate Ion Removal | | |
|---|---|---|---|---|---|---|---|---|---|---|
| | | | ppm | | | | | NH4 | Organic | Total |
| 1 | 15115 | 4999 | 9977 | 2435 | 883 | 0.88 | 0.49 | 68.4 | 24.1 | 92.5 |
| 2 | 14681 | 5104 | 9720 | 2914 | 1151 | 0.84 | 0.6 | 71.8 | 23.1 | 95.0 |
| 3 | 14681 | 5104 | 9720 | 2914 | 1151 | 0.84 | 0.6 | 71.8 | 23.1 | 95.0 |

Table 12C shows the conditions used to treat the wastewater and the effluent pH.

TABLE 12C

| Run | Inf pH | Eff pH | Eff Temp ° C. | Pressure psig | Feed Q ml/min | RT min |
|---|---|---|---|---|---|---|
| 1 | 1.8 | 1.6 | 372 | 3090 | 13.7 | 20.7 |
| 2 | 2.0 | 1.8 | 371 | 3060 | 13.2 | 21.4 |
| 3 | 2.0 | 1.8 | 371 | 3081 | 8.5 | 33.3 |

Tables 12D and 12E show the results of the treatment with respect to nitrate ion, ammonium ion, COD, TOC and acetate ion removal and corrosion of the reactor.

TABLE 12D

| Run # | Metals ppm | | | Nitrate Ion ppm | | | Ammonium Ion ppm | | |
|---|---|---|---|---|---|---|---|---|---|
| | Fe | Cr | Ni | Feed | Effluent | % Removed | Feed | Effluent | % Removed |
| 1 |  | 1.9 | 2.4 | 14314 | 698 | 95.1% | 5103 | 297 | 94.2% |
| 2 | 0.1 | 2.5 | 1.4 | 14773 | 1440 | 90.3% | 5348 | 714 | 86.6% |
| 3 | 0.4 | 3.4 | 1.1 | 14773 | 1114 | 92.5% | 5348 | 518 | 90.3% |

TABLE 12E

| Run # | COD mg $O_2$/liter | | | TOC mg Carbon/liter | | | Acetate ppm | | |
|---|---|---|---|---|---|---|---|---|---|
| | Feed | Effluent | % Removed | Feed | Effluent | % Removed | Feed | Effluent | % Removed |
| 1 | 2420 | 90 | 96.3% | 922 | 15 | 98.4% | 2503 | 8.3 | 99.7% |
| 2 | 3185 | 56 | 98.2% | 1158 | 33 | 97.2% | | | |
| 3 | 3185 | 45 | 98.6% | 1158 | 16 | 98.6% | | | |

In these examples the wastewaters were very close to being redox balanced but a little short on reducing agent. In all cases more than 90% of the nitrate was removed and except for Run 2 over 90% of the ammonium ion was also removed. In all cases the COD removal was over 96% as was the TOC. Since the strong acid anion, sulfate ion, was paired with sodium ion at least on a 1:1 molar basis, ($M/SO_4^2$ ratio of from 0.49 to 0.6) the wastewater pH never dropped below 1.6 and little corrosion was evident, i.e., little Fe, Cr or Ni ion in the effluent. By keeping the pH low using a 1:1 ratio of $Na^+:SO_4^{-2}$, the reaction rate was quite high, giving high conversion of all the oxidizing and reducing species in about 30 minutes or less, even though the sulfate ion concentration was on the order of 1% (10,000 ppm).

What is claimed is:

1. In a process for the wet oxidation of waste streams containing organic contaminants and contaminated with sulfur or phosphorous containing compounds, organic or inorganic, or both, using ammonium nitrate or precursor thereof as the oxidizing agent under conditions wherein the carbon and nitrogen forms are determined and the oxidized and reduced forms of carbon and nitrogen balanced such that the carbon forms are converted to carbon dioxide and the nitrogen forms are converted to nitrogen at desirable levels, under elevated temperature and pressure conditions sufficient to maintain liquid phase conditions, the improvement which comprises:

operating said process within a pH of from about 1.5 to 8, wherein the pH is controlled in the wet oxidation process by adding an alkali or alkaline earth metal or sulfur or phosphorus compounds in an amount necessary for maintaining a ratio of $M/SO_4^{-2}$ of from 0.1 to 4:1 and a ratio of $M/PO_4^{-3}$ of from 0.2 to 0.67:1 in the waste stream during the wet oxidation process wherein M is an alkali metal or alkaline earth metal cation and the ratio is maintained on an equivalence basis.

2. The method of claim 1 wherein the pH is controlled by addition of an alkali metal.

3. The method of claim 2 wherein the pH of the wet oxidation process is maintained within a range of about 1.8 to 4.

4. The method of claim 3 wherein the waste stream is contaminated with sulfur containing components and the pH is controlled by maintaining the ratio of $M/SO_4^{-2}$ from 0.2 to 1:1.

5. The method of claim 4 wherein the temperature of wet oxidation is from 300 to 400° C.

6. The method of claim 4 wherein the waste stream is a stream contaminated with nitroaromatics.

7. The method of claim 6 wherein a metal is added to the wastewater to maintain pH and the metal is an alkali metal.

8. The method of claim 7 wherein the alkali metal is sodium.

9. The method of claim 8 wherein the waste stream is contaminated with sulfur containing compounds and the $M/SO_4^{-2}$ ratio is maintained within a range of from 0.2 to 1:1.

* * * * *